United States Patent [19]

Levine et al.

[11] 4,172,969

[45] Oct. 30, 1979

[54] REAL TIME ABSENTEE TELEPHONE AND RADIANT WAVE SIGNALING SYSTEM

[76] Inventors: Alfred B. Levine, 2924 Terrace Dr.; Boris Haskell, 3715 Underwood St., both of Chevy Chase, Md. 20015

[21] Appl. No.: 718,609

[22] Filed: Aug. 30, 1976

Related U.S. Application Data

[63] Continuation of Ser. No. 637,454, Dec. 3, 1975, abandoned.

[51] Int. Cl.² .......................................... H04M 11/00
[52] U.S. Cl. ................................................... 179/2 EC
[58] Field of Search .................. 179/2 A, 2 E, 2 EA, 179/2 EC, 6 C, 90 AN, 2 EB, 6 R, 41 A

[56] References Cited

U.S. PATENT DOCUMENTS

| | | | |
|---|---|---|---|
| 3,133,992 | 5/1964 | Dickman | 179/6 R |
| 3,557,312 | 1/1971 | Vogelman et al. | 179/2 E |
| 3,686,440 | 8/1972 | Kroeger | 179/90 AN |
| 3,714,375 | 1/1973 | Stover | 179/2 E |
| 3,811,012 | 5/1974 | Barber | 179/2 A |
| 3,818,145 | 6/1974 | Hanway | 179/2 EC |
| 3,846,783 | 11/1974 | Apsell | 340/311 |
| 3,944,724 | 3/1976 | Kilby et al. | 340/311 |
| 3,984,775 | 10/1976 | Cariel et al. | 340/311 |
| 3,995,121 | 11/1976 | Alvis et al. | 179/6 C |
| 4,010,460 | 3/1977 | DeRosa | 340/311 |
| 4,010,461 | 3/1977 | Stodolski | 340/311 |

OTHER PUBLICATIONS

IBM Technical Disclosure Bulletin, vol. 16, No. 8, Jan. 1974, pp. 2448 & 2448a, "Automatic Paging System" A. Croisier.

*Primary Examiner*—Bernard Konick
*Assistant Examiner*—George G. Stellar

[57] ABSTRACT

A fully automatic communication system employing an automatic telephone answering device and a mobile radio transmitter and receiver for enabling a party calling another on the telephone to communicate to the mobile location of the other in "real time" that the call is being made and to relay the telephone number of the calling party. This enables the party being called to directly "telephone" back to the calling party without the need for first communicating with the telephone answering device.

In a more enhanced form, the system further permits the mobile party being called to acknowledge the reception of the call by transmitting an acknowledgment signal back to the telephone answering device to, in turn, notify the calling party that his call and calling number has been received by the party being called.

12 Claims, 3 Drawing Figures

REAL TIME ABSENTEE TELEPHONE AND RADIANT WAVE SIGNALING SYSTEM

CROSS REFERENCES TO RELATED APPLICATIONS

This application is a continuation of application Ser. No. 637,454 filed Dec. 3, 1975, now abandoned.

STATEMENT OF THE INVENTION

This invention relates to automatic communication systems employ the combination of wired communications means, such as telephones; automatic telephone answering systems; radiant energy transmitters, and portable mobile receivers, all being automatically combined in a telemetering arrangement to enable a person that is mobile and absent from the location of his own telephone receiver to directly obtain the telephone number or other coded message from a party calling his telephone.

BACKGROUND

It is presently well known to provide automatic telephone answering devices that automatically respond to telephone calls in the absence of the party being called to accept and record brief messages from the caller including the caller's name and telephone number. Such devices are also available that play back such recorded information over the phone to a different location of the party being called in response to a telephone command to do so, thereby enabling the party being called to receive the recorded telephone messages from a distant location without the need for returning to the home or office for obtaining such messages. However, available devices do not provide "real time" notification of the telephone calls and messages but instead rely upon "time delayed" recording of the messages, and periodic inquiry by the called party to the telephone answering device to determine if calls have been received in his absence and the message recorded.

It is also presently well known to remotely signal or to alert a person that is absent from the office that he is to return or telephone the office. Such signaling devices are generally provided in the form of a miniature mobile receiver being carried by the person and provided with an audible "beeper" or other alerting means, together with a radio or other radiant energy transmitter at the home or office that is operated to send the alerting or warning signal to the mobile radio receiver. Such signaling devices as have been used for this purpose require the presence of a person at the home or office location of the transmitter to both operate the transmitter as well as respond to any telephone call-back from the person being summoned or alerted by this signaling system so as to convey the messages to him.

SUMMARY OF THE INVENTION

In a preferred embodiment of the present invention, a completely automatic telephone system is provided that eliminates the need for human operator at the fixed location of the telephone being called, as well as eliminating the need for the party being called to call back the office or home to receive any messages. Instead, the party being called is not only alerted by a mobile receiver that the home or office has been called by telephone, but the mobile receiver also displays the telephone number of the party making the telephone call and/or other digitally coded message from the sender or calling party.

For performing these functions, there is provided at the receiver telephone, an automatic telephone answering device having a recorder and playback, that responds to each incoming call by instructing each caller to "dial" the calling telephone number. While the telephone connection between the calling and receiver telephone is "active", the dialing of such telephone number by the caller produces a corresponding digital code of pulses or tones over the telephone line to the receiver telephone, and this digital code is recorded by the automatic telephone answering device. The modified telephone answering device thereupon automatically transmits this digitized telephone number by radio wave, or other form of radiant energy, to a miniature mobile receiver being carried by the remotely located party being called. Upon reception of the radiant signal, the receiver is activated to alert the party being called and the digital number being transmitted is indicated by an LED display or other suitable display. The party being called may thereupon directly return a telephone call to the calling party without first calling back the telephone answering device for instructions and information.

In a modified embodiment, the mobile receiver being carried by the party being called may also be provided with a radio or other wave transmitter for enabling the called party to acknowledge to the caller in "real time" that the telephone call has been received. In this embodiment, the mobile called party operates the acknowledgement transmitter to radiate a signal back to the telephone answering device; and the telephone answering device responds to such acknowledgement signal to playback a prerecorded acknowledgement to the calling party while the calling party is still on the telephone line.

In both embodiments, the mobile party being called is immediately notified of his calls in "real time" as well as being notified of the telephone number of the calling party. In the second embodiment, the party making the call also receives an acknowledgement in "real time" that his call has been received and acknowledged by the party being called.

DETAILED DESCRIPTION OF A PREFERRED EMBODIMENT

Figure 1:
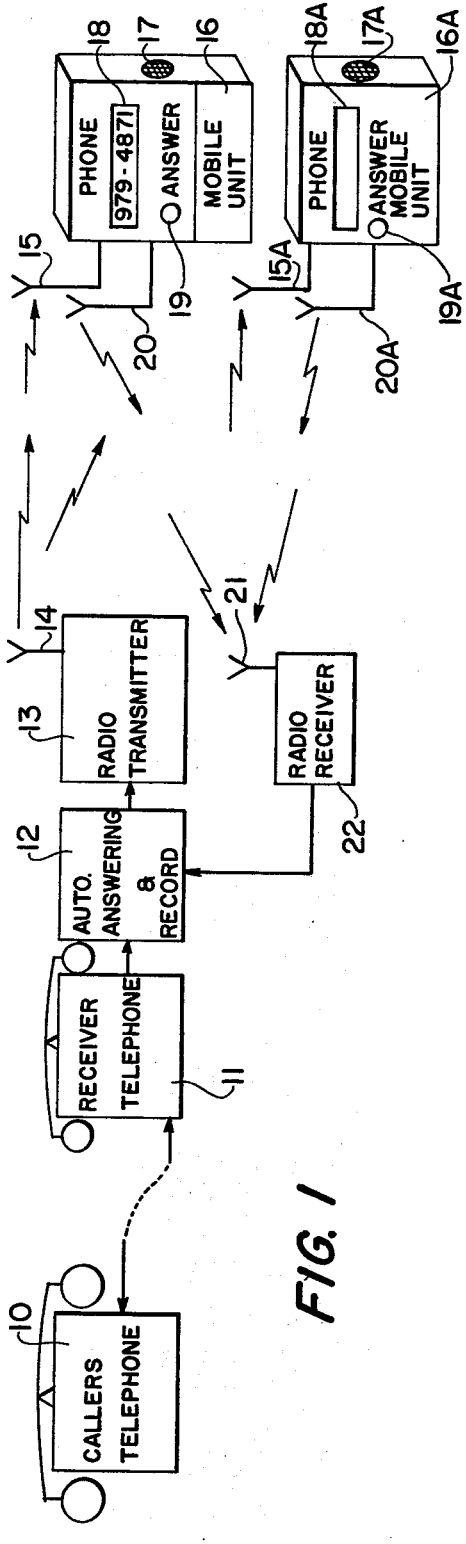
FIG. 1 is an electrical schematic diagram illustrating the entire signaling system from the party calling by telephone to the mobile receiver of the party being called.

Referring to FIG. 1 of the drawings, a preferred system comprises a typical telephone answering device 12 of a type presently available on the open market, that is coupled to the telephone receiver 11 of the party being called in the usual fashion. Such known devices 12 generally include a tape or disc recorder (not shown in FIG. 1) for the purpose of both playing back prerecorded instructions to the caller as well as recording brief messages from the caller, including the caller's name and telephone number.

For communicating between the telephone answering device 12 and the mobile location of the party being called, the answering device employs a radio transmitter 13 and antenna 14, and the called party is provided with a miniaturized portable radio receiver 16 and antenna 15 that is normally carried in the caller's pocket or is attached to a belt or the like. Such transmitters and receivers are also presently available, and in use on the open market, in the form of a simplified radio system operating on a single carrier frequency, usually within the frequency range of the Citizen's Band. The receiver 16 is conventionally provided with an audible sound speaker, or beeper 17 to signal the mobile user whenever a properly modulated radio signal from the transmitter 13 has been picked up by the receiver 16.

At the fixed location of the telephone being called, the transmitter 13 is coupled to the recorder of the telephone answering device 12 and is triggered into operation by the answering device 12 following the reception of a telephone call from the calling party. Upon receiving a call, the radio signal being emitted by antenna 14 of transmitter 13 is propagated to the mobile receiver 16, and is suitably detected and amplified by the receiver 16 to energize the audible beeper 17, or to operate a flashing light, or to energize another type of alerting device for gaining the attention of the party being called. At this time, the remotely located party being called has been notified in "real time" by the mobile receiver 16 that a telephone call has just been received by the answering device 12 at the location of his home or office, and the party being called may immediately telephone back to his home telephone 11 and obtain a play-back of any recorded message from the caller that may have been recorded by the telephone answering device 12.

According to the present invention, however, the mobile receiver 16, transmitter 13, and automatic telephone answering device 12 are all preferably modified in such manner as to also provide at the mobile receiver 16, a visual display 18 of the telephone number of the calling party. This is performed by having the calling party record his calling telephone number in digital form (as a series of pulses or tones) that are recorded in the memory of the telephone answering device 12; and employing such recorded digital pulses to modulate the single frequency carrier of the radio transmitter 13 so as to transmit the telephone number is digital form to the receiver 16. At the receiver 16, the modulated pulses or digitized tones are detected, amplified, counted, and visually displayed at 18 so that the party being called is not only immediately notified of the fact that a telephone call has been made to his home or office but is additionally provided with the telephone number of the calling party that is displayed as a number 18 on the mobile receiver unit 16. Having this information, the party being called may promptly telephone back to the calling party thereby providing almost immediate "real time" communication between the calling party and the called party.

Alternatively, the mobile receiver unit 16 may be provided with a 10 digit digital memory, as is typically provided in hand calculators, for anabling the displayed telephone number to be transferred from the counter display 18 into memory storage for retrieval at a later time at the convenience of the called party. In this manner, a number of telephone inquiries that may be received at times when the mobile party being called does not choose to, or is unable to return the calls, may be retained and collected in storage for call back at a later time. To insure that received calls are not forgotten or overlooked by the called party, or are automatically recorded in the event that the called party is not alerted to the call when it is received, the mobile receiver unit also preferably incorporates an automatic time delay transfer circuit for automatically transferring each of the received numbers 18 into the memory of the unit after a suitable fixed time interval on one minute or so following each operation of the audible beeper 17. In this manner, it is not necessary for the party being called to continually respond to each calling party, or to manually write down or otherwise record the numbers, but instead, the user may "readout" the calling numbers from the memory at his convenience and respond to each of such calls as necessary.

Figure 2:
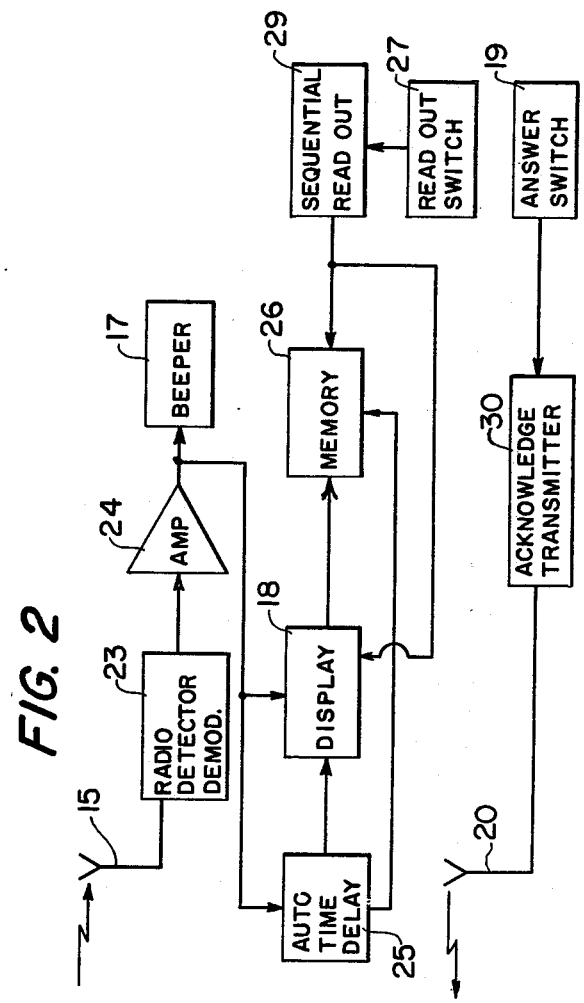
FIG. 2 is an electrical block diagram illustrating further details of the invention together with a modified mobile receiver.

FIG. 2 illustrates details of the automatic memory system as described above. As shown, each of the digitally modulated transmissions from transmitter 13 is received by mobile receiver antenna 15, detected at 23, and amplified at 24 to trigger into operation the audible signal "beeper" 17. The demodulated digital code of the calling number is also directed to the counter and display 18 for visually displaying the calling number as described above. Entry of the number into counter-display 18 also energizes an automatic time delay control circuit 25 to commence a preset time delay of about one minute following each visual display. Following the expiration of this time delayed display interval, the control circuit 25 energizes the memory 26 and enters the displayed calling number into memory circuit 26 from the counter-display 18. It also resets the counter-display 18 back into its initial condition for receiving the number of any subsequent caller. Resetting of the counter-display 18 also resets the audible signaler 17 to discontinue the audible signaling tone. This beeper 17 may also be manually disconnected or reset by the user at any time, as is known to those skilled in the art.

For subsequent readout of the stored telephone numbers from the memory 26, a sequential readout circuit 29 is manually energized by the user operating a command switch 27. The readout circuit 29 preferably includes a shift register (not shown) for sequentially interrogating each different position of the memory 26 in order in response to each succeeding manual actuation of the command switch 19 by the user. Each memory position being interrogated is sequentially interconnected with the counter-display 18 whereby each interrogation of a memory position results in the stored number being displayed by counter-display 18 for the user. Upon a subsequent actuation of the command switch 27, the counter-display 18 is reset and the stored telephone number in the next position of the memory 26 is displayed.

In a preferred mode-of-operation, the telephone answering deivce 12 responds to each phone call with a prerecorded message informing the caller that his call is being answered by an answering device 12 and instructing the caller to leave his name and to dial his calling number on the manually operated dial of his telephone. When dialing this number, the calling telephone emits a digital series of pulses corresponding to each digit of the phone number being dialed, or alternatively emits a different frequency tone for each digit. These digital signals are therefore conveyed over the telephone line to the receiver telephone and thense from the receiver phone to the recorder of the answering device 12. Such recorded digital signals are then applied to modulate the transmitter 13, thereby sending a modulated digital code to mobile receiver unit 16 where it is displayed at 18, as discussed above.

To provide a "real time" acknowledgement to the caller, notifying the caller that the call and the calling number have been received by the called party, the mobile receiver unit 16 may be provided with a fixed frequency acknowledgement transmitter 30 that is manually actuated to transmit by depressing on-off button 19 on the receiver unit. A fixed frequency acknowledgement receiver 22, provided at the telephone answering device 12, receives the acknowledgement signal from mobile unit 16 and energizes the playback unit of the answering device 12. The playback unit of answering device 12 responds to such energization by releasing a prerecorded audio message to the caller via telephones 11 and 10, informing the caller that the phone call has been transmitted to and received by the party being called along with the telephone number of the calling party, and that a return telephone call will be made.

Figure 3:
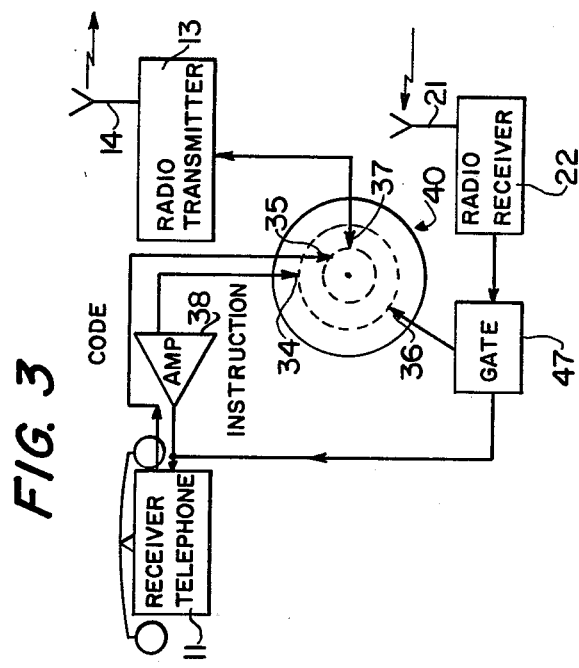
FIG. 3 is an electrical block diagram for illustrating details of the telephone answering and recording device.

FIG. 3 schematically illustrates the above described features of the telephone answering device as coupled to both the receiver telephone 11, the transmitter 13, and receiver 22. As shown, the answering device 12 includes a recorder 40 that may be a magnetic disc recorder or other suitable type, having a series of transducer heads 34, 35, 36, and 37 and disc record 40. Transducer head 34 plays back prerecorded audio messages of instruction to the caller via telephones 11 and 10. Transducer head 35 records the calling telephone number in digital form on a separate track of the record 40; head 37 plays back the digitally recorded telephone number to the transmitter; and finally head 36 plays back a prerecorded audio message to the caller acknowledging that the call has been received by the called party. A suitable gate 47 is provided in the circuit interconnecting the prerecorded audio acknowledgement transducer 36 with the phone 11, and gate 47 is closed in response to the audio receiver 22 detecting the receipt of a radio signal of acknowledgement from the mobile transmitter, enabling the audio acknowledgement message to be sent to the calling party.

As will be appreciated by those skilled in this art, many changes may be made without departing from the invention. For example, in the event that the mobile receiver is used inside of a building such as a hospital, a magnetic wave apparatus may be used instead of an electromagnetic radio wave. At the mobile receiver, an automatic read out of the telephone numbers from the memory may be used instead of the described sequential read out by use of a switch and shift register circuit. Still further, a single answering telephone and telephone answering device 12 may be employed to relay telephone call information to a plurality of remotely located mobile stations. To distinguish between such different mobile stations, the calling party can be additionally instructed to dial into his telephone, a different code number for each different person to be called. For example, if the caller wishes to place a call to "Jones", he is instructed by the prerecorded message to dial the number "1" preceeding the dialing of his telephone number. If he wishes "Smith", he is instructed to dial "2"; or if "Thompson" then to dial "3". In a well known manner, each mobile receiver may be made responsive to a different first digit of a received code, whereby Jones' receiver responds only to a code number preceeded by the number "1", Smith by the number "2" and the like. Since these any other changes may be made without departing from this invention, this invention should be considered as limited only by the following claims:

What is claimed is:

1. A personalized telephone-radiant wave pager system connectable to a telephone receiver at the location of the party being called comprising:
    an automatic telephone answering device connectable to the receiver telephone, said answering device having a prerecorded playback message automatically responsive to the call to inform the caller to dial a number for transmission to the party to be paged,
    a radiant wave transmitter coupled to the answering device and responsive to the dialed number received from the caller to automatically transmit the number via a radiant energy wave,
    and a portable pager receiver adapted to be carried by the person to be paged and responsive to the radiant energy wave to detect and visually indicate the number dialed by the caller.

2. In the system of claim 1, said memory of the automatic telephone answering device including a prerecorded message requesting that the calling party "dial" his telephone number to be recorded as a digitized signal by the answering device.

3. In the system of claim 1, said receiver having a memory, and control means for selectively enabling the storing and readout of the caller's dialed digital number into and from said memory.

4. In the system of claim 1, said portable receiver including a memory, means for storing each received caller's telephone number in said memory, and means for selectively reading out said numbers and indicating said numbers.

5. In the system of claim 1, said portable receiver including a memory, means for automatically storing each of said caller's numbers in said memory after a fixed time interval following detection and display of said numbers and automatically resetting said receiver in condition to receive any subsequent calling numbers, and manually operable means for sequentially reading out of said memory each of said stored numbers and displaying each of said numbers as it is retrieved from storage.

6. In the system of claim 1, a plurality of said portable receivers adapted to be carried by different persons, each responsive to said radiant wave signal, and each receiver being selectively responsive to a different code number for identifying the person being called; said memory of the automatic telephone answering device recording both the dialed number of the calling party and an additional dialed code number from the party being called, and said radiant energy transmitter automatically transmitting both of said dialed numbers.

7. In the system of claim 6, each of said receivers having a memory, and means for storing and reading out from said memory the caller's telephone number.

8. In the system of claim 1, said portable receiver having an acknowledgement transmitter that is actuable by the party being called, to transmit a radiant energy acknowledgement signal, and said telephone answering device responsive to said radiant acknowledgement signal to automatically notify the calling party that the called party has been notified of the call and been given the telephone number of the calling party.

9. In the system of claim 8, said memory of the automatic telephone answering device including a prerecorded message informing the caller that the called party as been notified of the call and has been given the telephone number of the calling party, and said telephone answering device responsive to said radiant acknowledgement signal to play back said prerecorded message.

10. A real time personalized privacy telephone signaling system comprising:
an automatic telephone answering device disposed at a receiver telephone,
a radiant energy transmitter coupled to the answering device and responsive to a telephone call being received from a caller,
a movable remote receiver accessible to the party being called,
means at the answering device and transmitter for sequentially receiving from callers and automatically transmitting digitized messages from callers as received by the telephone answering device,
means at the remote receiver for receiving and indicating such digital messages enabling the party being called to directly receive the messages from the calling parties without first communicating with the telephone answering device to obtain said messages,
said remote receiver including a memory, means for automatically storing each of said caller's digital messages in said memory after a fixed time interval following detection and display of said numbers, and automatically resetting said receiver in condition to receive any subsequent digital messages, and manually operable means for sequentially reading out of said memory each of said stored messages and displaying each of said digital messages as it is retrieved from storage.

11. A real time absentee telephone signalling system comprising:
an automatic telephone answering device disposed at a receiver telephone,
a radiant energy transmitter coupled to the answering device and responsive to a telephone call being received from a caller to transmit a signal,
a movable remote receiver accessible to the party being called and responsive to the transmitted signal,
means at the answering device and transmitter for sequentially receiving from the caller and transmitting a digitized message from the caller as received by the telephone answering device,
means at the receiver for receiving and indicating such digital message, enabling the party being called to directly receive the message from the calling party without first communicating with the telephone answering device to obtain such message,
said receiver having an acknowledgement transmitter that is actuable by the party being called, to transmit a radiant energy acknowledgement signal, and said telephone answering device responsive to said radiant acknowledgement signal to automatically notify the calling party that the called party has been notified of the call and been given the digital message from the calling party, said automatic telephone answering device including a prerecorded message informing the caller that the called party has been notified of the call and has been given the digital number from the calling party, and said telephone answering device responsive to said radiant acknowledgement signal to play back said prerecorded message.

12. A real time absentee telephone signaling system comprising:
an automatic telephone answering device disposed at a receiver telephone,
a radiant energy transmitter coupled to the answering device and responsive to a telephone call being received from a caller to transmit a signal,
a movable remote receiver accessible to the party being called and responsive to the transmitted signal,
means at the answering device and transmitter for sequentially receiving from the caller and transmitting a digitized message from the caller as received by the telephone answering device,
means at the receiver for receiving and indicating such digital message, enabling the party being called to directly receive the message from the calling party without first communicating with the telephone answering device to obtain said message,
said receiver having an acknowledgement transmitter that is actuable by the party being called, to transmit a radiant energy acknowledgement signal, and said telephone answering device responsive to said radiant acknowledgement signal to automatically notify the calling party that the called party has been notified of the call and been given the digital message from the calling party.

* * * * *